United States Patent
Barnhart

(10) Patent No.: US 10,406,420 B2
(45) Date of Patent: Sep. 10, 2019

(54) PORTABLE LIGHTING APPARATUS AND CARRYING RACK

(71) Applicant: MORE USELESS TOOLS, INC., Los Angeles, CA (US)

(72) Inventor: Robert T. Barnhart, Los Angeles, CA (US)

(73) Assignee: MORE USELESS TOOLS, INC., Los Angeles, CA (US)

( * ) Notice: Subject to any disclaimer, the term of this patent is extended or adjusted under 35 U.S.C. 154(b) by 0 days.

(21) Appl. No.: 14/699,872

(22) Filed: Apr. 29, 2015

(65) Prior Publication Data

US 2016/0320050 A1    Nov. 3, 2016

(51) Int. Cl.
| | |
|---|---|
| *A63B 69/00* | (2006.01) |
| *A63B 69/36* | (2006.01) |
| *F21L 4/02* | (2006.01) |
| *F21L 4/08* | (2006.01) |
| *H02J 7/35* | (2006.01) |
| *F21V 7/00* | (2006.01) |
| *A63B 71/00* | (2006.01) |
| *A63B 57/30* | (2015.01) |
| *F21V 23/04* | (2006.01) |
| *F21Y 115/10* | (2016.01) |

(52) U.S. Cl.
CPC ............ *A63B 69/36* (2013.01); *A63B 57/357* (2015.10); *A63B 71/0036* (2013.01); *F21L 4/02* (2013.01); *F21L 4/08* (2013.01); *F21V 7/0016* (2013.01); *H02J 7/35* (2013.01); *A63B 2207/02* (2013.01); *A63B 2210/50* (2013.01); *A63B 2220/805* (2013.01); *A63B 2225/09* (2013.01); *F21V 23/0464* (2013.01); *F21Y 2115/10* (2016.08)

(58) Field of Classification Search
CPC .............. F21V 33/008; A63B 2207/02; A63B 57/0056; A63B 69/3632; A63B 43/06; A63B 37/003; A63B 57/00; A63B 2225/0093; F21L 4/02; F21L 4/08
See application file for complete search history.

(56) References Cited

U.S. PATENT DOCUMENTS

| | | | | |
|---|---|---|---|---|
| 5,445,373 A | * | 8/1995 | Franks | .................. A63B 43/06 473/150 |
| 6,305,820 B1 | | 10/2001 | Poon | |
| 7,021,787 B1 | * | 4/2006 | Kuelbs | ..................... A45B 3/04 362/183 |
| 7,824,061 B1 | | 11/2010 | Riedfort et al. | |
| 7,985,004 B1 | * | 7/2011 | Schach | ................... F21S 8/083 362/240 |

(Continued)

OTHER PUBLICATIONS

Unknown, Toro Brochure, Firestone—OH, 38 pages.

*Primary Examiner* — Gerald J Sufleta, II
(74) *Attorney, Agent, or Firm* — Lewis Roca Rothgerber Christie LLP

(57) ABSTRACT

A portable lighting apparatus is disclosed. The portable lighting apparatus includes a shaft, a lighting assembly coupled to a first end of the shaft, and a base coupled to a second end of the shaft. The lighting assembly includes a housing, a bulb coupled to an outer surface of the housing, and a cover coupled to the housing and overhanging the bulb. An inner surface of the cover facing the bulb is adapted to reflect light emitted from the bulb. The portable lighting apparatus also includes a rechargeable battery coupled to the bulb.

15 Claims, 11 Drawing Sheets

(56) References Cited

U.S. PATENT DOCUMENTS

| | | |
|---|---|---|
| 8,794,815 B2 | 8/2014 | Hsien |
| 9,108,097 B1* | 8/2015 | Rhone ................ A63B 69/3676 |
| 2007/0147024 A1* | 6/2007 | Wu .......................... A45B 3/04 |
| | | 362/102 |
| 2010/0004068 A1 | 1/2010 | Adame |
| 2010/0147918 A1* | 6/2010 | Hensley ................... B62J 9/001 |
| | | 224/600 |
| 2010/0160057 A1 | 6/2010 | Willett |
| 2011/0075404 A1 | 3/2011 | Allen et al. |
| 2011/0273866 A1* | 11/2011 | Chang ...................... A45B 3/02 |
| | | 362/102 |
| 2012/0113625 A1* | 5/2012 | Werner ..................... F21L 4/08 |
| | | 362/183 |
| 2013/0210534 A1* | 8/2013 | Suchanek ............... A63B 57/00 |
| | | 473/150 |
| 2013/0314906 A1* | 11/2013 | Spinner ................ F21V 33/008 |
| | | 362/145 |
| 2014/0185278 A1 | 7/2014 | Burkart et al. |
| 2015/0084296 A1* | 3/2015 | Murphy ................. A63B 55/00 |
| | | 280/40 |

* cited by examiner

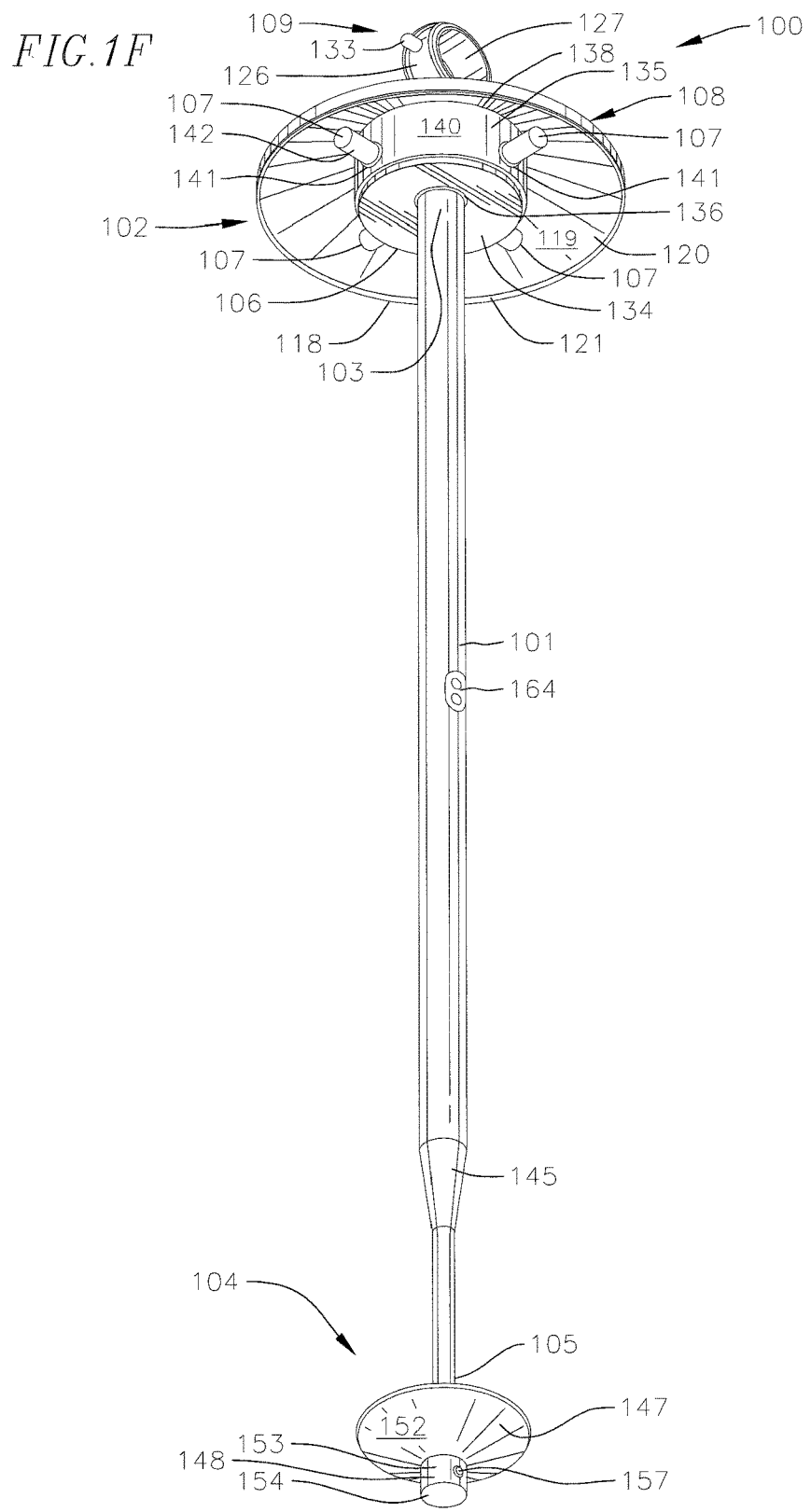

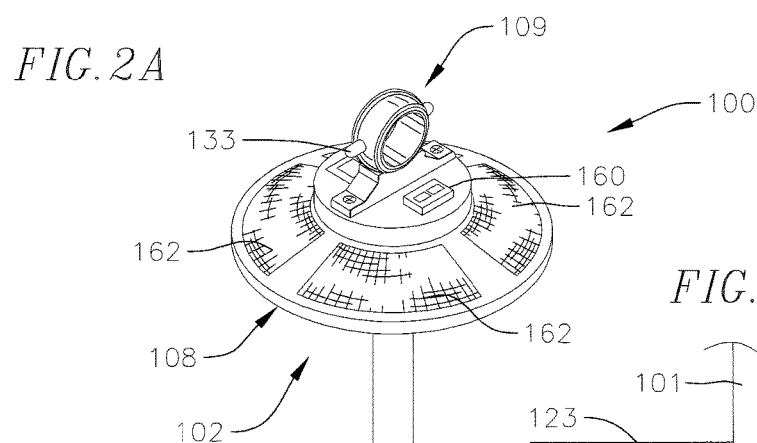
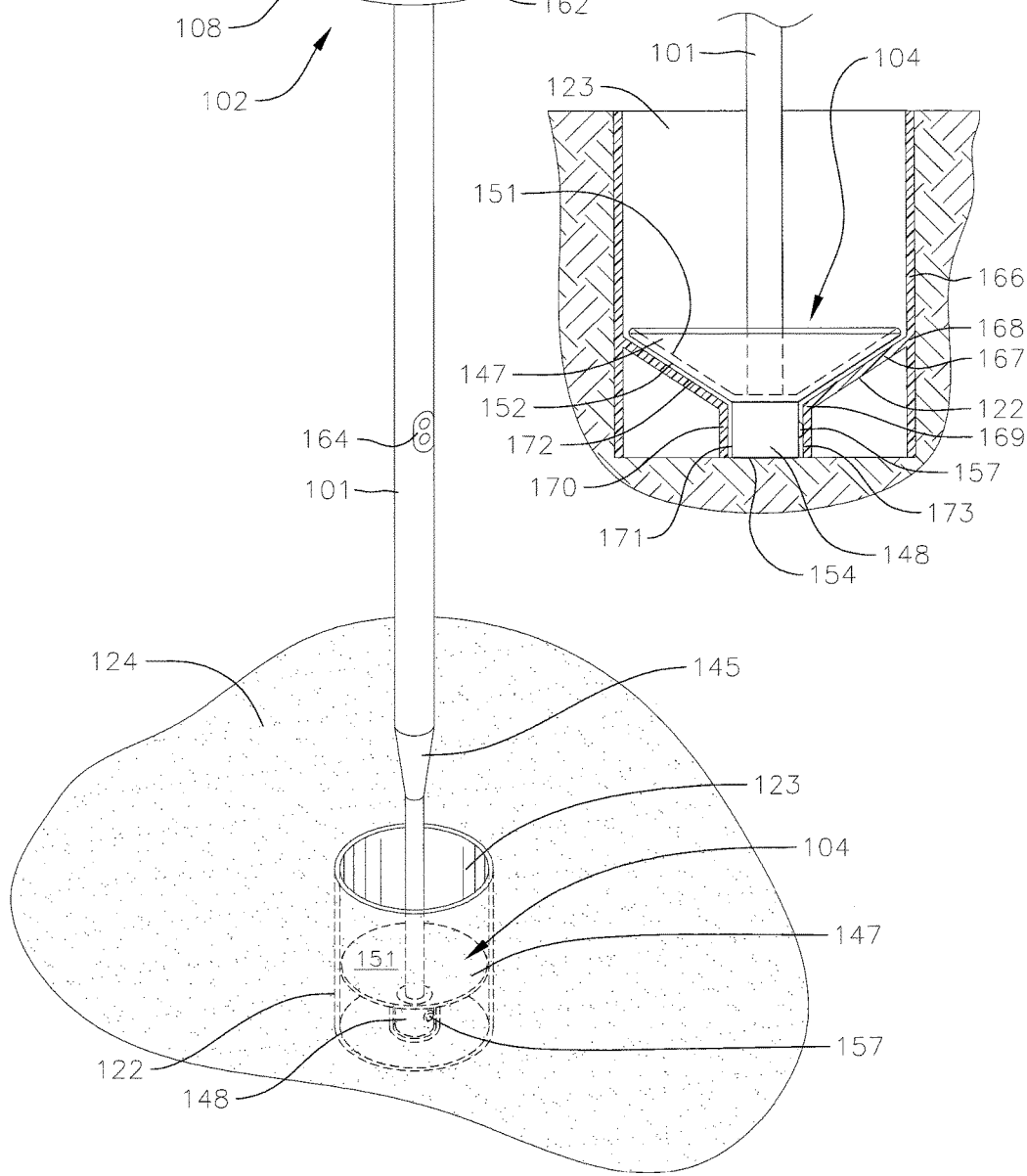

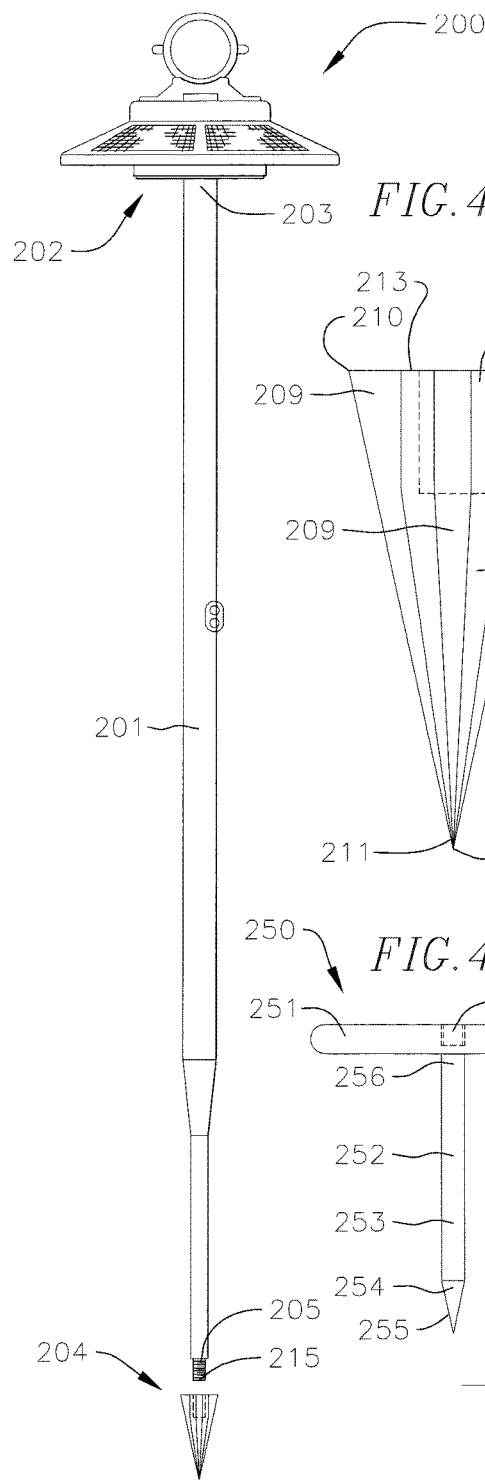
FIG. 4A
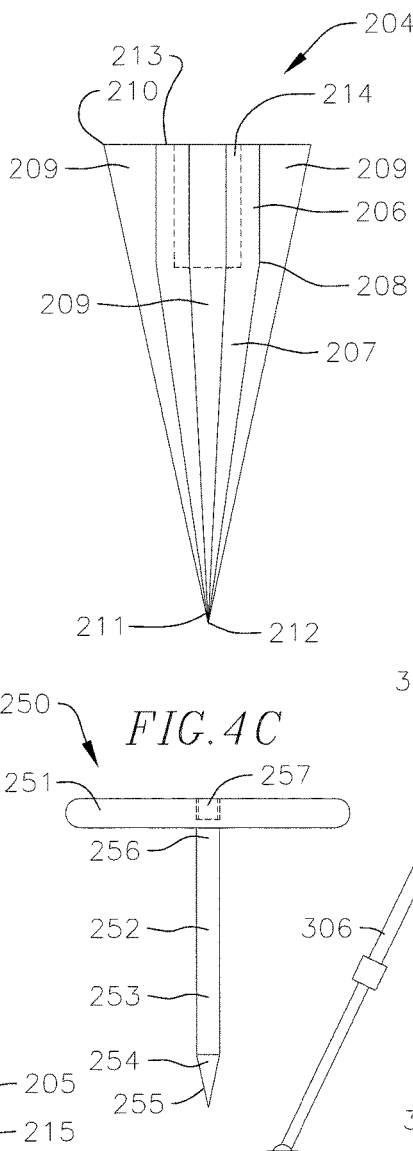
FIG. 4B
FIG. 4C
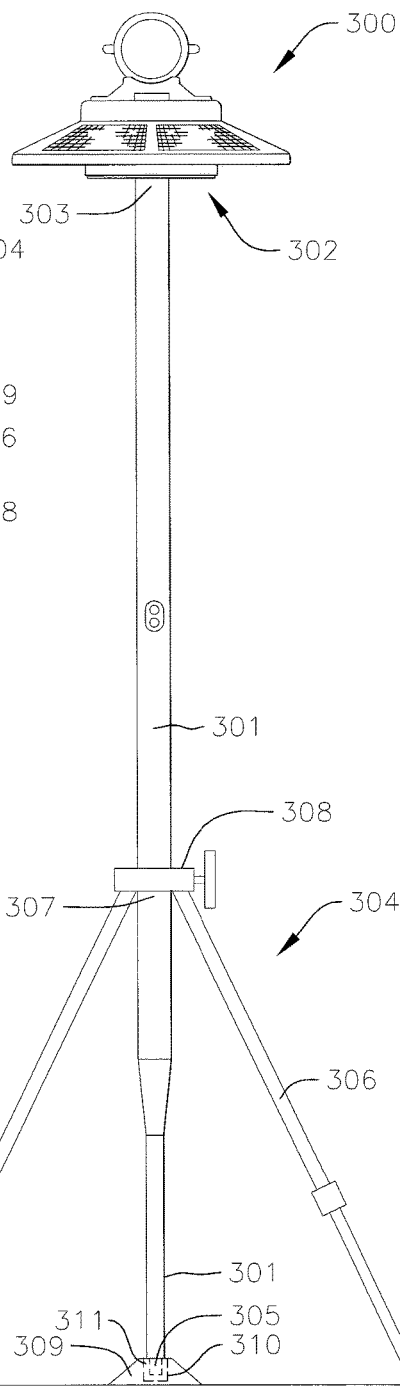
FIG. 5

PORTABLE LIGHTING APPARATUS AND CARRYING RACK

FIELD

The present disclosure relates generally to lighting systems and, more particularly, to a portable lighting apparatus and a carrying rack.

BACKGROUND

Portable lighting units are commonly used to provide temporary illumination for a variety of purposes, such as for safety (e.g., the illumination of a pathway at night) or for aesthetics (e.g., to illuminate an object on display). Additionally, portable lighting units may be used to illuminate a practice putting green at a golf course to facilitate putting at nighttime. Conventional lighting units for putting greens include an overhead light source. However, overhead lighting sources require substantial infrastructure, such as lamp posts and underground wiring, and therefore may be prohibitively expensive. Additionally, conventional overhead lighting systems may disperse light and such light pollution may disturb neighbors on adjacent properties.

Other conventional lighting units for putting greens include illuminated cups for the holes. However, such illuminated cups are limited to lighting the hole, rather than the area of the putting green surrounding the hole. Additionally, illuminated cups require a high degree of daily maintenance because the cups must be removed from the hole to be recharged and swapped with the standard cups that are used during daytime putting. Moreover, because the illuminated cups are frequently moved (e.g., due to the changed layout of the holes in the putting green), it is not generally feasible to hardwire the illuminated cups to a power source. Other conventional lighting units may include light elements in a flagstick. However, these conventional flagstick lights do not direct light to the cup and the hole. Additionally, light emitted from these conventional flagstick lights may be directed into a golfer's eyes, which may distract and/or inhibit the golfer from putting effectively.

SUMMARY

The present disclosure is directed to various embodiments of a portable lighting apparatus. In one embodiment, the portable lighting apparatus includes a shaft, a lighting assembly coupled to a first end of the shaft, and a base coupled to a second end of the shaft. The lighting assembly includes a housing, at least one bulb coupled to an outer surface of the housing, and a cover coupled to the housing and overhanging the at least one bulb. An inner surface of the cover facing the at least one bulb is adapted to reflect light emitted from the at least one bulb. The portable lighting apparatus also includes a rechargeable battery coupled to the bulb. The rechargeable battery may be housed in the shaft. The base may be configured to engage a golf cup in a golf hole and may include a frusto-conical ball-catcher and a cylindrical plug extending down from a lower end of the frusto-conical ball-catcher and adapted to mate with a central bore in the golf cup. The base may include a spike. The base may include a series of legs. The portable lighting apparatus may also include a handle coupled to the cover. The portable lighting apparatus may further include a bulb coupled to the handle and configured to illuminate the handle. The portable lighting apparatus may include a switch coupled to the bulb and configured to activate and deactivate the bulb. The switch may be a pressure sensor coupled to the base and configured to activate the bulb when a threshold pressure on the base is detected or a push-button switch coupled to the base and configured to move between an extended position in which the bulb is deactivated and a depressed position in which the bulb is activated.

The lighting assembly may also include at least one solar cell coupled to the rechargeable battery to recharge the rechargeable battery. The portable lighting apparatus may also include a charging port coupled to the rechargeable battery. The lighting assembly may further include a light sensor configured to illuminate the bulb when ambient light reaches a minimal intensity. The bulb may be any suitable type or kind of light-emitting component, such as a light-emitting diode (LED) or a laser activated remote phosphor (LARP) component. The lighting assembly may include a series of LEDs equidistantly arranged around the outer surface of the housing. The cover may include a flared wall extending outward from a longitudinal axis of the shaft and extending downward toward the second end of the shaft. The first end of the shaft may have a first size and the second end of the shaft may have a second size smaller than the first size. The shaft may also include a taper between the first end and the second end.

The present disclosure is also directed to various embodiments of a carrying rack configured to support a series of portable lighting apparatuses. The carrying rack may support at least one power supply unit having an electrical plug configured to plug into a charging port in the portable lighting apparatus to charge the rechargeable battery in the portable lighting apparatus. The carrying rack may include a pair of vertical support members, a series of shelves extending between the pair of vertical support members, and a handle configured to facilitate transportation of the carrying rack. The power supply unit may be supported on one of the shelves. The carrying rack may also include a series of pairs of hooks coupled to the pair of vertical support members. Each of the pairs of hooks may include a relatively smaller hook and a relatively larger hook. The pairs of hooks may be configured to support the portable lighting apparatuses in alternating orientations on the carrying rack.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 1A-1H are a front view, an enlarged partial front view, an exploded front view, a side view, a top perspective view, a bottom perspective view, a top view, and a bottom view, respectively, of a portable lighting apparatus according to one embodiment of the present disclosure;

FIGS. 2A and 2B are a perspective view and a partial cross-sectional view, respectively, of the embodiment of the portable lighting apparatus illustrated in FIGS. 1A-1H installed in a hole in a practice putting green;

FIG. 4A is a perspective view of a portable lighting apparatus according to another embodiment of the present disclosure;

FIG. 4B is an enlarged detail view of a spike of the embodiment of the portable lighting apparatus illustrated in FIG. 4A;

FIG. 4C is an enlarged detail view of a spike according to another embodiment of the present disclosure;

FIG. 5 is a perspective view of a portable lighting apparatus according to a further embodiment of the present disclosure.

DETAILED DESCRIPTION

Figure 1A:
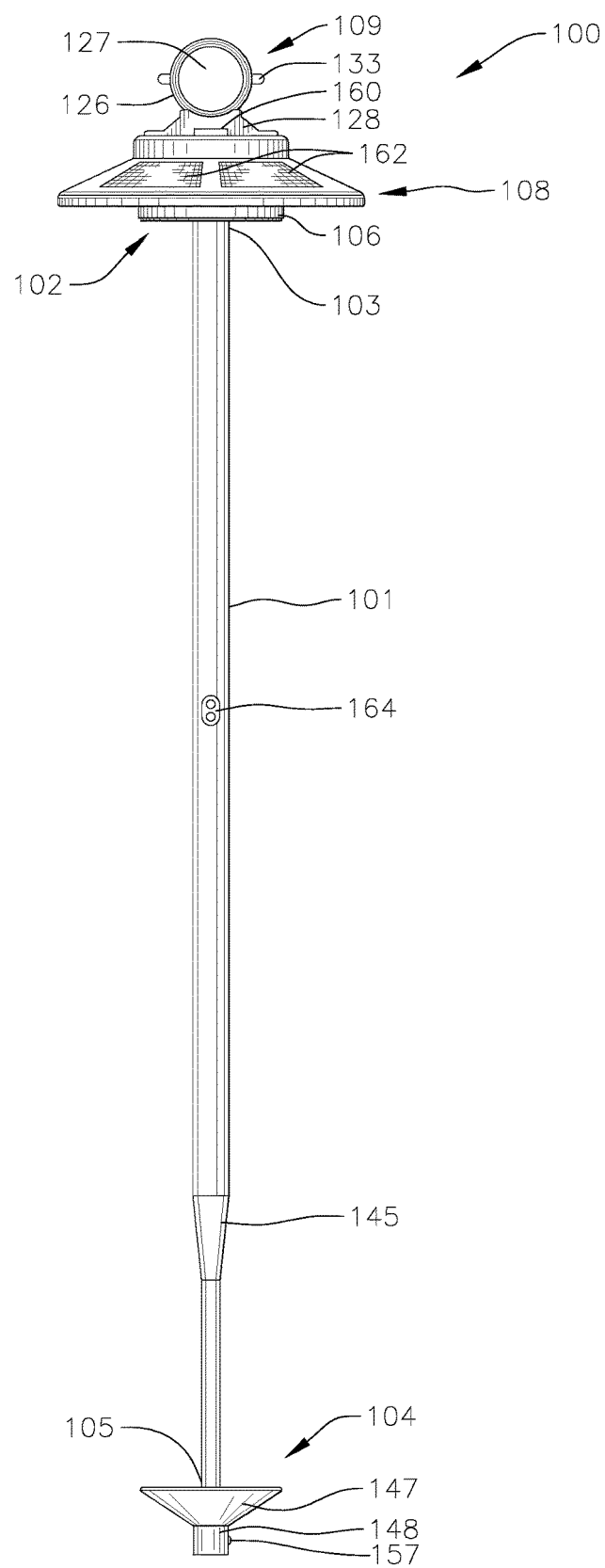
Figure 1B:
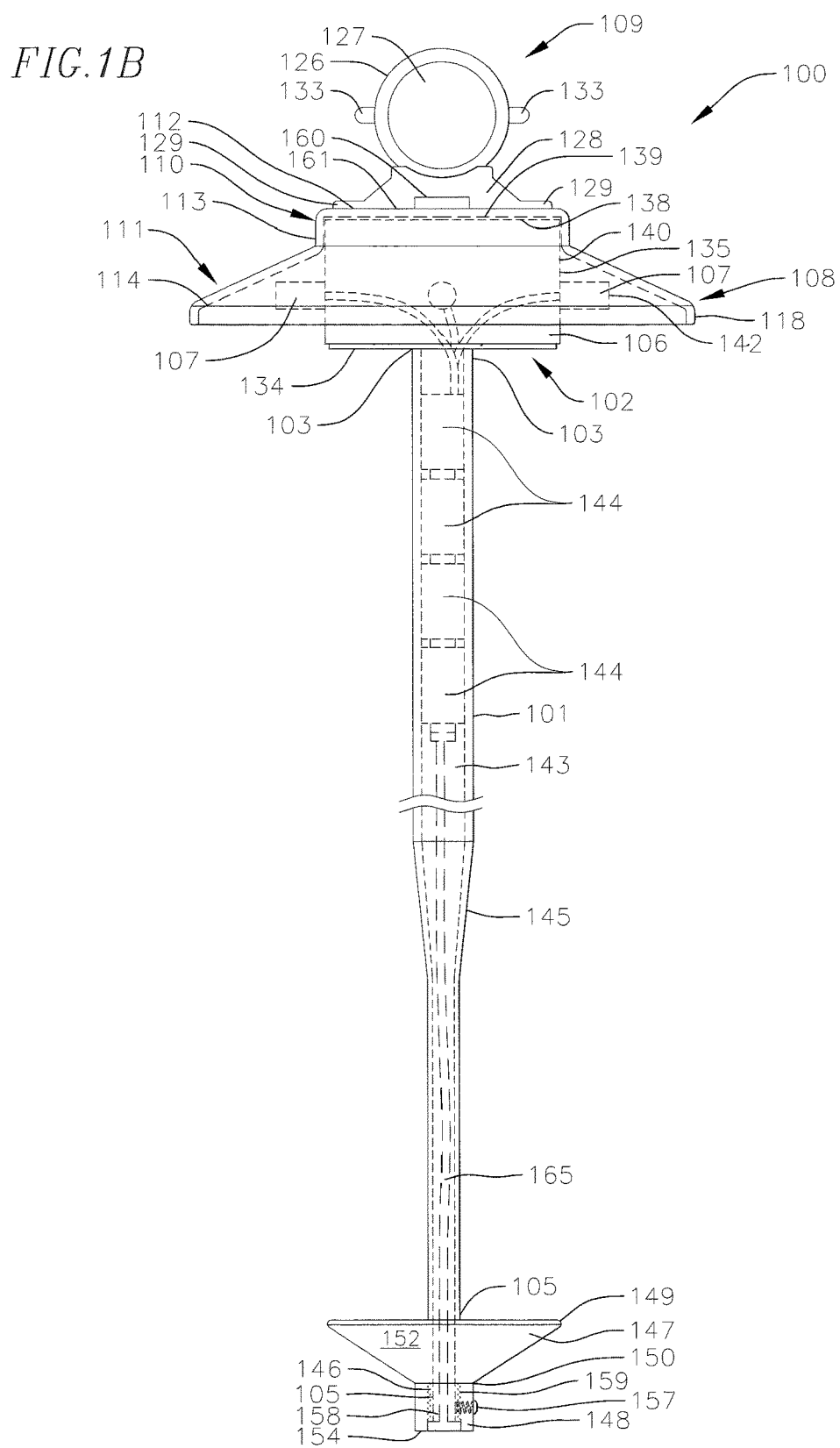
Figure 1C:
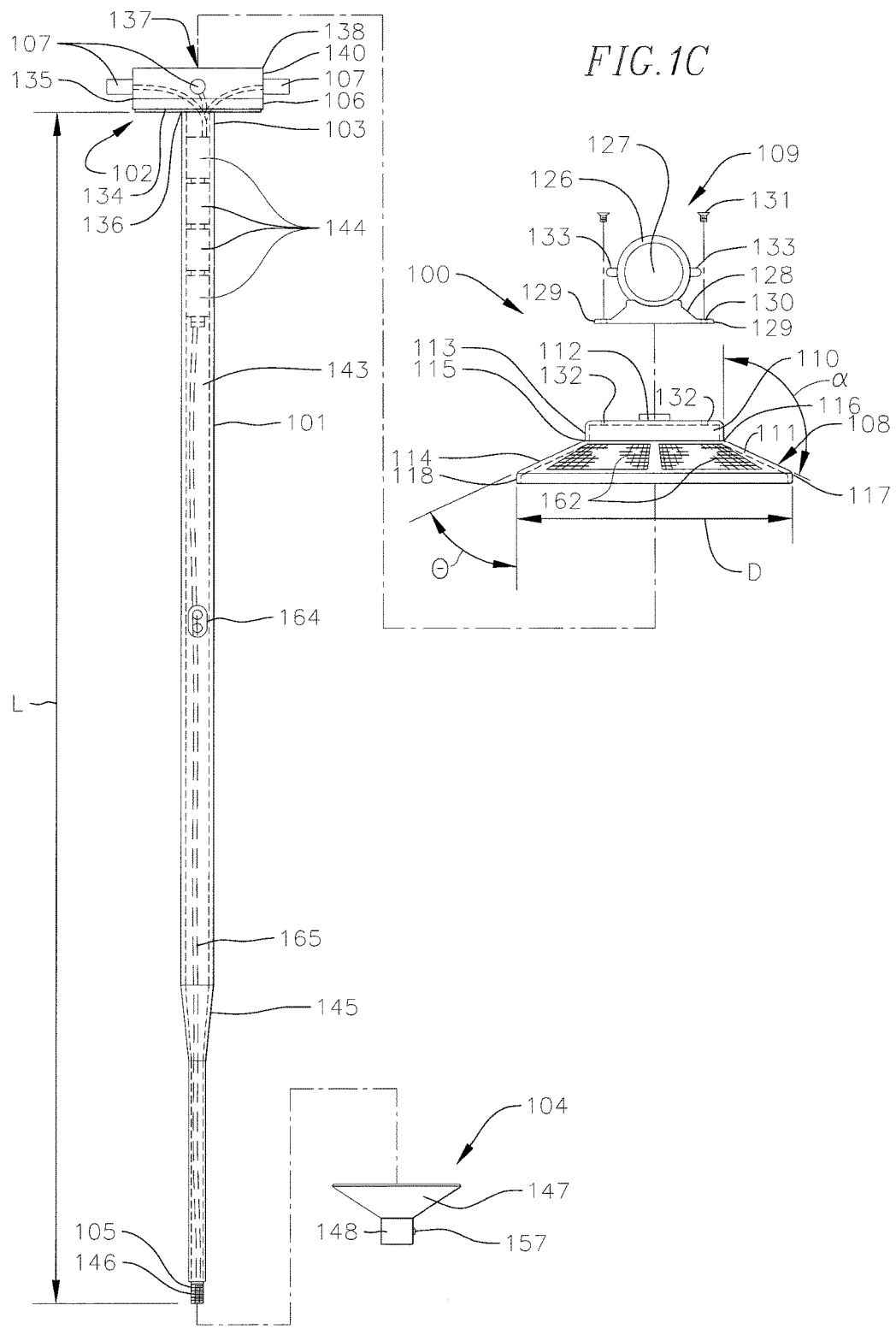
Figure 1D:
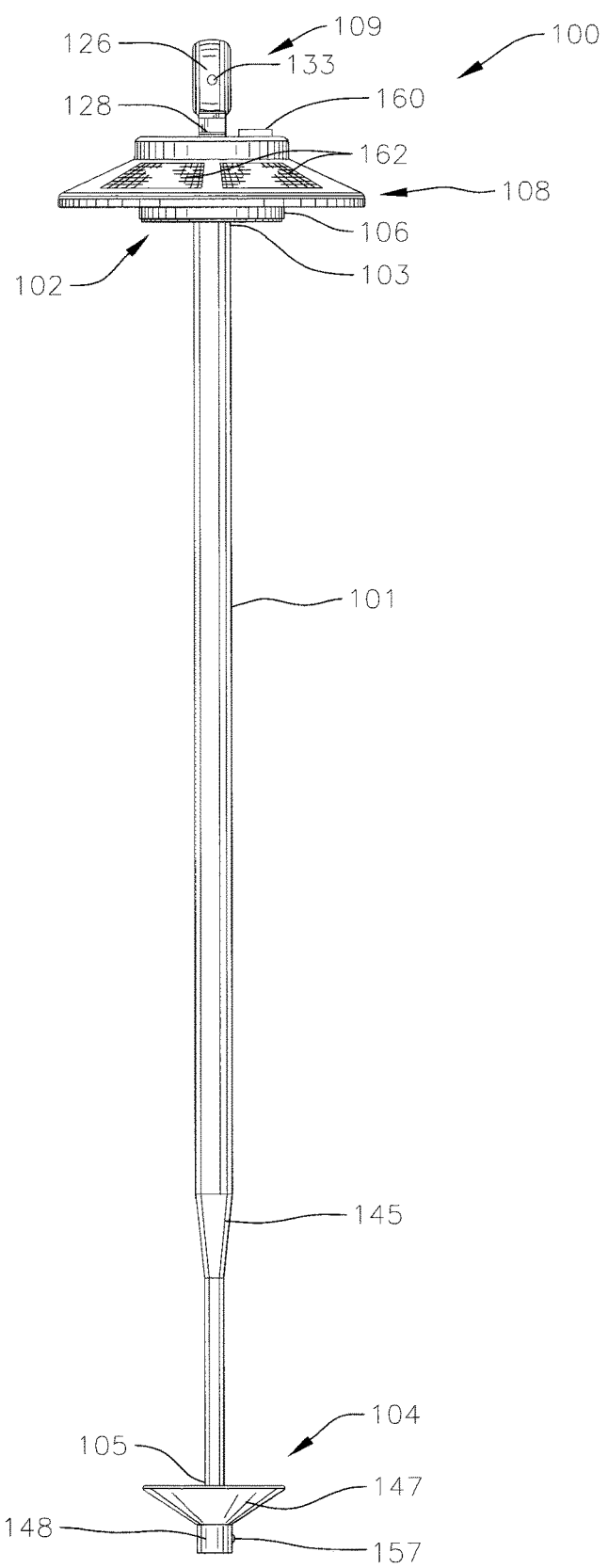
Figure 1E:
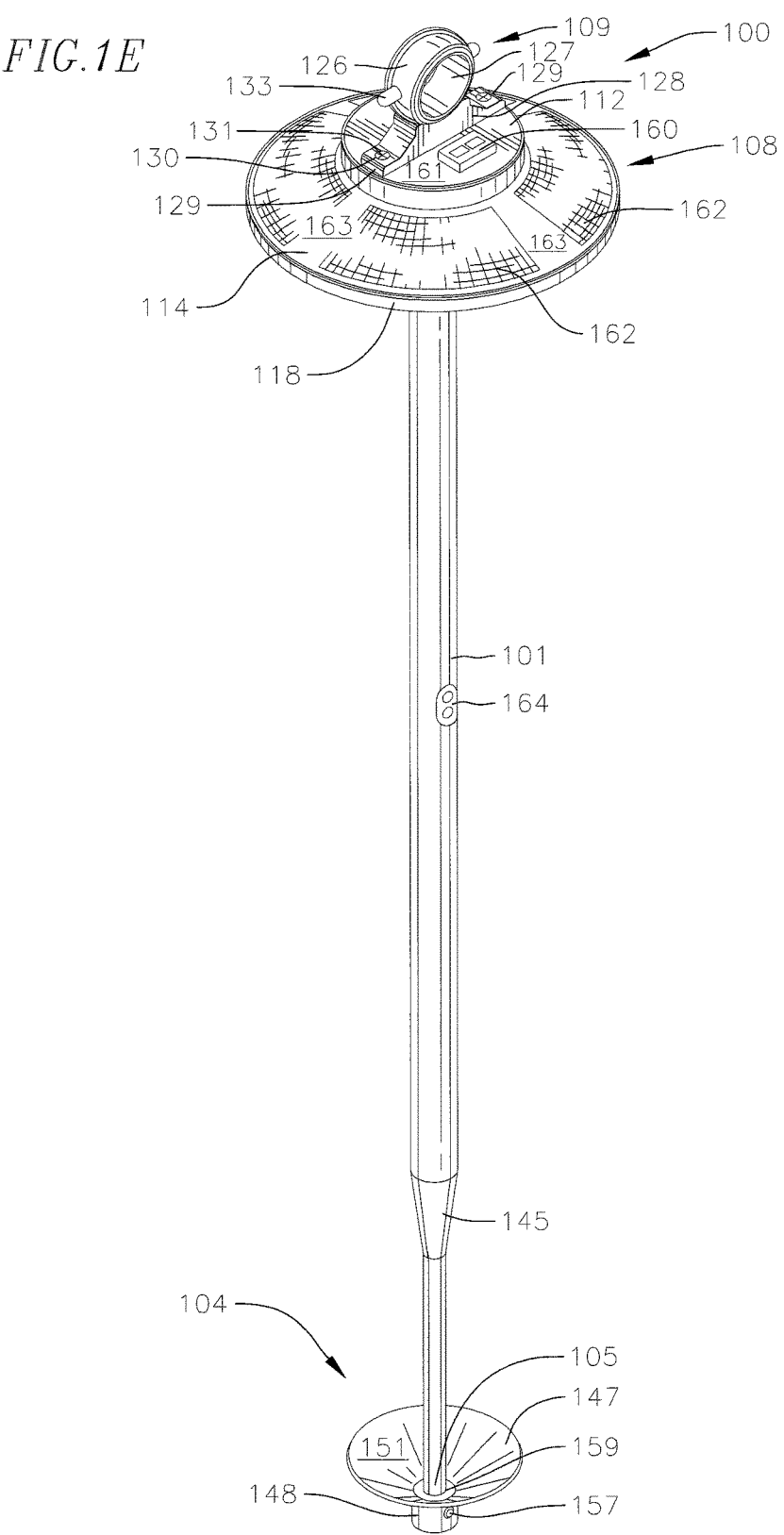
Figure 1G:
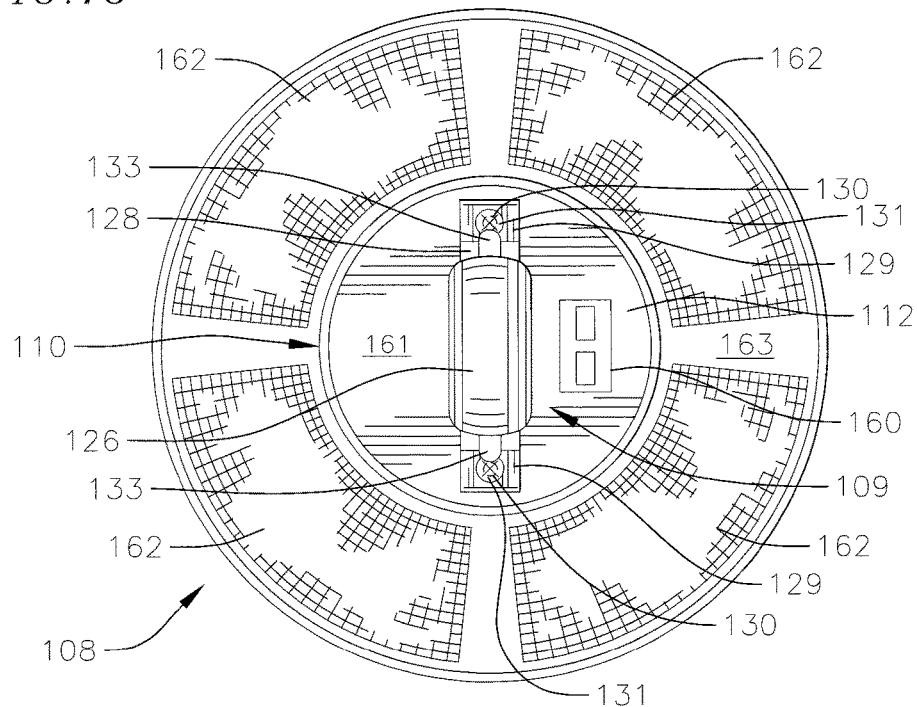
Figure 1H:
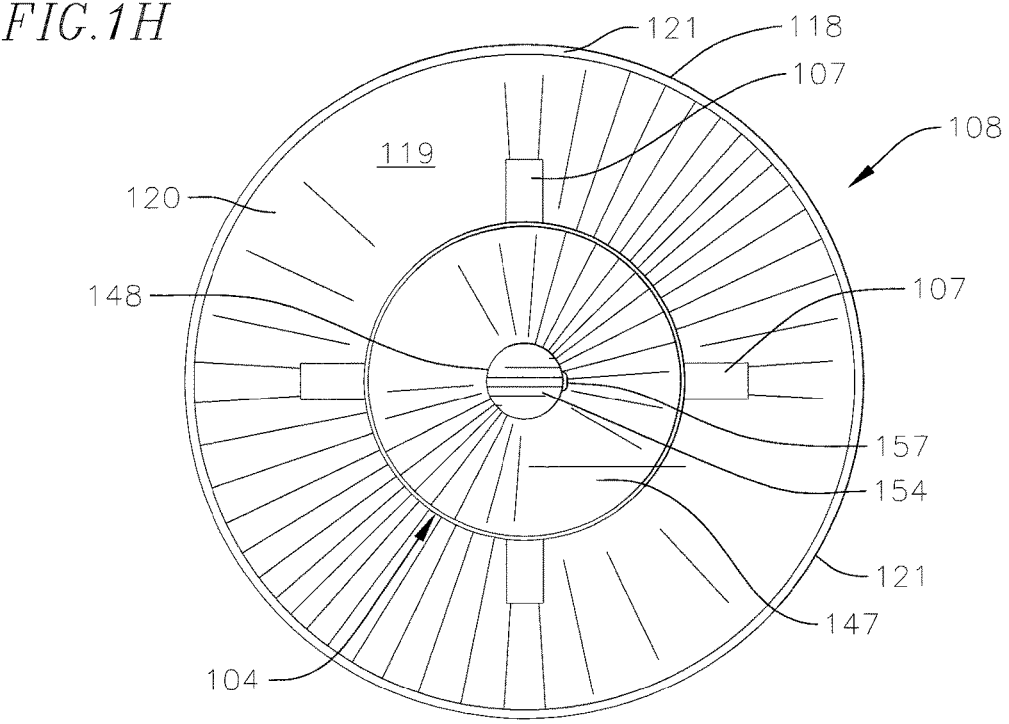

The present disclosure is directed to various embodiments of a portable lighting apparatus. The portable lighting apparatus according to various embodiments of the present disclosure is configured to engage a cup of a golf hole such that the portable lighting apparatus provides illumination for a golf course practice putting green. Accordingly, the portable lighting apparatus according do various embodiments may replace a conventional practice golf flagstick or a conventional putting green marker to enable or facilitate twilight and nighttime putting practice. Additionally, various embodiments of the portable lighting apparatus may be installed and operated without permanent (e.g., underground) wiring. The portable lighting apparatus according to various other embodiments of the present disclosure is configured to be supported in any other suitable location, such as, for instance, in any earthen formation or on any structure. For instance, various embodiments of the portable lighting apparatus may be stuck into the ground to provide illumination along a pathway. The present disclosure is also directed to a carrying rack configured to support a series of portable lighting apparatuses for ease of transportation. The carrying rack according to various embodiments of the present disclosure also includes a power supply unit configured to recharge the portable lighting apparatuses supported on the carrying rack.

With reference now to FIGS. 1A-1H, a portable lighting apparatus 100 according to one embodiment of the present disclosure includes a shaft 101, a lighting assembly 102 coupled to an upper end 103 of the shaft 101, and a base 104 detachably coupled to a lower end 105 of the shaft 101. In the illustrated embodiment, the lighting assembly 102 includes a housing 106, at least one bulb 107 on the housing 106, a cover 108 configured to direct the light emitted from the bulb 107, and a handle assembly 109 coupled to the cover 108. As used herein, the term "bulb" refers to any suitable light-emitting component, such as, for instance, a light-emitting diode (LED) or a laser activated remote phosphor (LARP) component.

In the illustrated embodiment, the cover 108 includes a cap 110 and a shade 111 coupled to the cap 110. The shade 111 of the cover 108 overhangs the one or more bulbs 107. In the illustrated embodiment, the cap 110 is a cylindrical member having a circular top wall 112 and a cylindrical sidewall 113 extending down from a periphery of the top wall 112. In the illustrated embodiment, the shade 111 of the cover 108 is a frusto-conical member having a flared wall 114 extending downward and outward from a lower end 115 of the cylindrical sidewall 113 of the cap 110. The flared wall 114 of the cover 108 tapers between a narrower upper end 116 at the lower end 115 of the cylindrical sidewall 113 and a wider lower end 117. The flared wall 114 may extend out from the cylindrical sidewall 113 at any suitable angle α, such as, for instance, from approximately 90 degrees to approximately 150 degrees. In the illustrated embodiment, the angle α at which the flared wall 114 extends out from the cylindrical sidewall 113 is approximately 135 degrees. Additionally, the wider lower end 117 of the flared wall 114 may have any suitable size, such as, for instance, a diameter D from approximately 4 inches to approximately 12 inches. In one or more embodiments, the cover 108 may have any other suitable shape. For instance, the cap 110 of the cover 108 may be prismatic (e.g., having a square top and a square prismatic sidewall extending down from the square top) and the shade 111 of the cover 108 may be a tapered prismatic shape (e.g., a square frustum). Accordingly, although in the illustrated embodiment the cap 110 and the shade 111 of the cover 108 each a single wall segment, in one or more embodiments, the cap 110 and the shade 111 of the cover 108 may include any other suitable number of wall segments depending on the shape of the cover 108. For instance, in an embodiment in which the cap 110 of the cover 108 is square prismatic and the shade 111 of the cover 108 is a square frustum, the sidewall of the cap 110 includes four square wall segments and the flared wall 114 of the shade 110 includes four trapezoidal wall segments. Additionally, although in the illustrated embodiment the cap 110 and the shade 111 are integrally formed, in one or more embodiments, the cap 110 and the shade 111 may be separately formed and coupled together by any suitable mechanism, such as, for instance, fasteners (e.g., rivets), a bayonet-style connection, a threaded connection, or combinations thereof. Furthermore, in one or more embodiments, the cover 108 may be provided without the shade 111.

Additionally, in the illustrated embodiment, the shade 111 of the cover 108 includes a lip 118 extending down from and extending peripherally around the lower end 117 of the flared wall 114. In the illustrated embodiment, the lip 118 extends at an angle θ (e.g., approximately 225 degrees) relative to the flared wall 114 such that the lip 118 is vertical or substantially vertical. Although in the illustrated embodiment the lip 118 extends vertically, in one or more alternate embodiments, the lip 118 may extend at any other suitable angle θ relative to the flared wall 114, such as, for instance, from greater than approximately 180 degrees to approximately 240 degrees. Additionally, in one or more embodiments, the cover 108 may be provided without the lip 114.

In the illustrated embodiment, at least a portion of an inner surface 119 of the flared wall 114 includes a light-reflective surface 120. The light-reflective surface 120 may include a light-reflective material, such as, for instance, metal (e.g., polished aluminum), plastic, optically reflective silicone, polyethylene terephthalate (PET), biaxially-oriented polyethylene terephthalate (BoPET), or combinations thereof. The light-reflective material may be applied as a coating or a film to the inner surface 119 (or a portion thereof) of the flared wall 114. In one or more embodiments, the inner surface 119 (or a portion thereof) of the flared wall 114 may be made reflective by forming the flared wall 114 (or a portion thereof) from a reflective material. In one or more embodiments, at least a portion of an inner surface 121 of the lip 118 is also reflective. The reflective surface 120 on the inner surface 119 of the flared wall 114 is configured to direct light emitted from the one or more bulbs 107 outwardly and downwardly along the shaft 101 toward the base 104 of the portable lighting apparatus 100. Accordingly, when the portable lighting apparatus 100 is inserted into a golf cup 122 in a hole 123 in a putting green 124 (see FIGS. 2A and 2B), the one or more bulbs 107 are configured to illuminate the hole 123, the cup 122, and an area of the putting green 124 immediately surrounding the hole 123 and the cup 122. In the illustrated embodiment, the light emitted from the one or more bulbs 107 is configured to reflect downward off of the reflective material 120 on the inner surface 119 of the flared wall 114 of the cover 108 to illuminate the cup 122, the hole 123, and the area of the putting green 124 immediately surrounding the hole 123 and the cup 122. The size of the flared wall 114 of the cover 108 (e.g., the diameter D of the flared wall 114 and the angle α of the flared wall 114) may be selected based on the desired size of the area of the putting green 124 immediately surrounding the hole 123 and the cup 122 that is illuminated by the portable lighting apparatus 100. In general, increasing the diameter D of the flared wall 114 and/or reducing the angle α at which the flared wall 114 extends increases the size of the area of the putting green 124 surrounding the cup 122 and the hole 123 that is illuminated by the portable lighting apparatus 100.

With continued reference to the embodiment illustrated in FIGS. 1A-1H, the handle assembly 109 coupled to the cover 108 is configured to facilitate lifting the portable lighting apparatus 100. For example, in one embodiment in which the portable lighting apparatus 100 is used to replace a conventional flag stick on the practice putting green 124 (see FIGS. 2A and 2B), the handle assembly 109 may be used to lift the portable lighting apparatus 100 out of the cup 122 and the hole 123 to retrieve a golf ball putted into the hole 123 and the cup 122. In the illustrated embodiment, the handle assembly 109 includes an annular member 126 defining an opening 127 and a base member 128 supporting the annular member 126. The annular member 126 is oriented in an upright manner such that a longitudinal axis of the annular member 126 is horizontal or substantially horizontal. In one or more embodiments, the annular member 126 may have any other suitable orientation. In the illustrated embodiment, the base member 128 of the handle assembly 109 includes a pair of opposing feet 129. Each of the feet 129 define an opening 130 configured to receive a fastener 131 (e.g., a screw) to couple the handle assembly 109 to a corresponding pair of openings 132 in the top wall 112 of the cap 110 of the cover 108. In one or more embodiments, the handle assembly 109 may be configured to be coupled to the cover 108 in any other suitable manner. Additionally, although in the illustrated embodiment the handle assembly 109 is detachable from the cover 108, in one or more alternate embodiments, the handle assembly 109 may be integral with the cover 108 (e.g., the cover 108 and the handle assembly 109 may be a monolithic component). Additionally, in one or more embodiments, the handle assembly 109 may have any other suitable configuration, such as, for instance, a hook or a sphere. The handle assembly 109 may be positioned at any other suitable location on the portable lighting apparatus 100, such as, for instance, along the shaft 101. In one or more embodiments, the handle assembly 109 may be configured to be illuminated. For instance, in one or more embodiments, one or more bulbs 133 may be coupled to the base member 128 and/or the annular member 126 to illuminate the handle assembly 109. The one or more bulbs 133 may be any suitable type or kind of light-emitting component, such as, for instance, one or more LEDs and/or one or more LARPs. In one or more embodiments, the portable lighting apparatus 100 may be provided without the handle assembly 109. Still further, the handle assembly 109 may include custom indicia, for example, a monogram or logo representative of the golf course or golf club, and/or may include advertising indicia.

Still referring to the embodiment illustrated in FIGS. 1A-1H, the housing 106 is a cylindrical member having a circular bottom wall 134 and a cylindrical sidewall 135 extending up from a periphery of the circular bottom wall 134. The bottom wall 134 of the housing 106 defines an aperture 136 (e.g., a hole) configured to receive the upper end 103 of the shaft 101. The housing 106 may be coupled to the upper end 103 of the shaft 101 by any suitable mechanism. For instance, in one or more embodiments, the upper end 103 of the shaft 101 may be threaded and the shaft 101 may be coupled to the housing 106 by one or more nuts. Additionally, in one or more embodiments, the housing 106 may include a gasket (e.g., one or more o-rings) in the aperture 136 to create a watertight seal between the aperture 136 in the housing 106 and the shaft 101. In one or more embodiments, the housing 106 may have any other suitable shape, such as, for instance, a prismatic shape (e.g., square prismatic). Together, the bottom wall 134 and the sidewall 135 of the housing 106 define an inner cavity or chamber 137 to house various electrical components and wiring to actuate the one or more bulbs 107, 133. Additionally, an upper end 138 of the cylindrical sidewall 135 of the housing 106 is configured to be coupled to a lower surface 139 of the top wall 112 of the cover 108. The cylindrical sidewall 135 of the housing 106 may be coupled to the top wall 112 of the cover 108 by any suitable mechanism, such as, for instance, with a threaded connection or with a bayonet-style mount. Although in one or more embodiments the cover 108 is detachably coupled to the housing 106, in one or more embodiments, the cover 108 may be fixedly coupled to the housing 106 (e.g., by riveting, adhering, and/or welding). Additionally, in one or more embodiments, the lighting assembly 102 may include at least one gasket (e.g., one or more o-rings) on the upper end 138 of the cylindrical sidewall 135 of the housing 106 and/or the lower surface 139 of the top wall 112 of the cover 108 to create a watertight seal between the housing 106 and the cover 108 and thereby protect the various electronic components housed in the inner chamber 137 of the housing 106.

In the embodiment illustrated in FIGS. 1A-1H, the one or more bulbs 107 (e.g., LEDs) are coupled to an outer surface 140 of the cylindrical sidewall 135 of the housing 106. In the illustrated embodiment, cylindrical sidewall 135 of the housing 106 includes a series of openings 141 corresponding to the number of bulbs 107. Electrical wiring for each of the one or more bulbs 107 extends out from the inner chamber 137 of the housing 106, through the openings 141 in the cylindrical sidewall 135, and is coupled to the bulb 107. Additionally, in the illustrated embodiment, each of the bulbs 107 includes a watertight seal or covering 142. Although in the illustrated embodiment the bulbs 107 are equidistantly spaced around the entire perimeter of the cylindrical sidewall 135 of the housing 106, in one or more embodiments, the bulbs 107 may be biased to one or more portions of the cylindrical sidewall 135 based upon the desired direction of the illumination provided by the bulbs 107. The bulbs 107 (e.g., LEDs) may emit any desired color light, such as, for instance, white, red, blue, or green. In one or more embodiments, the bulbs 107 may be red-green-blue light-emitting diodes (RGB LEDs) configured to emit red light, green light, blue light, or combinations thereof. Additionally, in one or more embodiments, the lighting assembly 102 may include a controller (e.g., a remote control) configured to select the color emitted by the RGB LEDs. For instance, in one embodiment in which a series of portable lighting apparatuses 100 are installed on the practice putting green 124, one of the portable lighting apparatuses 100 may be set by the controller to emit one color (e.g., white) while the remainder of the portable lighting apparatuses 100 are set by the controller to emit a different color (e.g., blue) to facilitate a game in which golfers compete to put into the hole 123 and the cup 122 in which the portable lighting apparatus 100 emitting the white light is installed. Additionally, in one or more embodiments, at least a portion of the outer surface 140 of the cylindrical sidewall 135 of the housing 106 includes a reflective material, such as, for instance, metal (e.g., polished aluminum), plastic, optically reflective silicone, PET, BoPET, or combinations thereof; to direct the light emitted from the one or more bulbs 107 outward toward the reflective material 120 on the inner surface 119 of the flared wall 114 of the cover 108.

Still referring to the embodiment illustrated in FIGS. 1A-1H, the shaft 101 is a hollow cylindrical member (e.g. a tube) defining an interior cavity 143. In the illustrated embodiment, the interior cavity 143 of the shaft 101 houses one or more rechargeable batteries 144. The one or more rechargeable batteries may be any suitable type or kind of rechargeable batteries, such as, for instance, lithium-ion (Li-ion) batteries, lithium ion polymer (Li-ion polymer), nickel cadmium (NiCd) batteries, nickel metal hydride (NiMH) batteries, and/or sealed lead acid (SLA) batteries. In one or more embodiments in which the shaft 101 houses two or more rechargeable batteries 144, the batteries 144 may be wired either in serial or in parallel depending on the desired capacity and voltage. In one embodiment, two or more Li-ion batteries 144 are wired in series and the portable lighting apparatus 100 includes one or more protection circuit modules electrically coupled to the batteries 144 to prevent the batteries 144 from over charging and/or over discharging. The batteries 144 are electrically coupled to the one or more bulbs 107 on the housing 106 of the lighting assembly 102. In one or more embodiments, the one or more rechargeable batteries 144 may also be coupled to the one or more bulbs 133 in the handle assembly 109.

Additionally, in the illustrated embodiment, the upper end 103 of the shaft 101 is wider than the lower end 105 of shaft 101. In one embodiment, the upper end 103 of the shaft 101 has a diameter of approximately 1.0 inch or greater. In one embodiment, the lower end 105 of the shaft 101 has a diameter of approximately 0.5 inch or less (e.g., the lower end 105 of the shaft 101 may be the same or substantially the same diameter as a conventional golf flagstick or a conventional putting green marker for use on a practice putting green). Accordingly, in one or more embodiments, the upper end 103 of the shaft 101 is sized to accommodate the one or more rechargeable batteries 144 housed in the shaft 101 and the lower end 105 of the shaft 101 is sized to permit a golf ball to fall into the hole 123 and the cup 122 (i.e., the lower end 105 of the shaft 101 does not obstruct the golf ball from entering the hole 123 and the cup 122), as illustrated in FIGS. 2A and 2B. Accordingly, in an embodiment in which the portable lighting apparatus 101 is configured to engage the hole 123 and the cup 122 in the putting green 124, the shaft 101 functions in the same or similar manner to a conventional golf flagstick or a conventional putting green marker. In the illustrated embodiment, the shaft 101 also includes a tapered section 145 between the larger upper end 103 and the smaller lower end 105. The lower end 105 of the shaft 101 also includes external threads 146 configured to couple the base 104 to the shaft 101. In one or more embodiments, the lower end 105 of the shaft 101 may include any other suitable mechanism for coupling the base 104 to the shaft 101 (e.g., the lower end 105 of the shaft 101 may include one or more apertures for receiving one or more fasteners). The shaft 101 may have any suitable length L depending on the desired height of the one or more bulbs 107 that is suitable for the intended use of the portable lighting apparatus 101, such as, for instance, from approximately 12 inches to approximately 96 inches. In one or more embodiments, the length L of the shaft 101 may be less than 12 inches or greater than 96 inches.

The embodiment of the base 104 illustrated in FIGS. 1A-1H, which is configured to engage the hole 123 and the cup 122 in the putting green 124, includes a ball-catcher 147 and a plug 148. In the illustrated embodiment, the ball-catcher 147 is a frusto-conical member tapering from a wider upper end 149 to a narrower lower end 150. The frusta-conical ball-catcher 147 of the base 104 also includes an upper surface 151 and a lower surface 152. Although in the illustrated embodiment the ball-catcher 147 of the base 104 is solid, in one or more embodiments, the ball-catcher 147 may include one or more drainage holes (e.g., the ball-catcher 147 of the base 104 may include a series of circumferentially arranged webs spaced apart by drainage holes). Additionally, in the illustrated embodiment, the plug 148 of the base 104 is a cylindrical member extending down from the narrower lower end 150 of the ball-catcher 147. In the illustrated embodiment, the plug 148 of the base 104 includes a cylindrical sidewall 153 and a lower circular surface 154.

In the embodiment illustrated in FIGS. 2A and 2B, the cup 122 includes a cylindrical sidewall 166 lining the hole 123 and a frusto-conical ball-catcher support wall 167 extending inward and downward from the cylindrical sidewall 166. The frusto-conical ball-catcher support wall 167 tapers between a wider upper end 168 and a narrower lower end 169. The cup 122 also includes a cylindrical receptacle 170 extending downward from the narrower lower end 169 of the frusto-conical ball-catcher support wall 167. The cylindrical receptacle 170 of the cup 122 defines a central bore 171. When the portable lighting apparatus 100 is inserted into the hole 123 and the cup 122 in the putting green 124, as illustrated in FIGS. 2A and 2B, the lower surface 152 of the ball-catcher 147 of the base 104 rests on an upper surface 172 of the frusto-conical ball-catcher support wall 167 of the cup 122 and the plug 148 extends into (e.g., mates with) the central bore 156 defined by the cylindrical receptacle 170 of the cup 122. Additionally, when a golf ball is putted into the hole 123, the golf ball will rest on the upper surface 151 of the ball-catcher 147 of the base 104 such that the golf ball may be retrieved from the hole 123 by lifting portable lighting apparatus 100 out of the hole 123 (e.g., by lifting the handle assembly 109). In one or more embodiments, the ball-catcher 147 and the plug 148 of the base 104 may have any other suitable shapes, depending, for instance, on the shape of the cup 122 the portable lighting apparatus 100 is designed to engage.

In the illustrated embodiment, the base 104 also includes a switch 157 coupled to the one or more bulbs 107. The switch 157 is configured to activate and deactivate the one or more bulbs 107 on the housing 106. The switch 157 may be any suitable type of switch, such as, for instance, a push-button switch or a pressure sensor. In the illustrated embodiment, the portable lighting apparatus 100 includes a push-button switch 157 on the lower surface 154 of the plug 148 of the base 104. The push-button switch 157 is configured to move between an extended position in which the one or more bulbs 107 are deactivated and a depressed position in which the one or more bulbs 107 are activated. Additionally, in the illustrated embodiment, the push-button switch 157 includes a spring mechanism 158 configured to bias the push-button switch 157 into the extended position. When the portable lighting apparatus 100 is inserted into the hole 123 and the cup 122, the engagement between the cup 122 and the base 104 depresses the push-button switch 157, thereby activating the one or more bulbs 107, 133. For instance, in the illustrated embodiment, the switch 157 is located on the cylindrical sidewall 153 of the plug 148 of the base 104 and an inner surface 173 of the cylindrical receptacle 170 of the cup 122 is configured to engage and depress the push-button switch 157 when the portable lighting apparatus 100 is inserted into the hole 123 and the cup 122. When the portable lighting apparatus 100 is removed from the cup 122 (e.g., to retrieve a golf ball from the hole 123 or when the portable lighting apparatus 100 is being placed into storage), the cup 122 disengages the base 104 of the portable lighting apparatus 100, thereby allowing the push-button switch 157 to return to the extended position and deactivating the one or more bulbs 107, 133. Although in the illustrated embodiment the switch 157 is located on the cylindrical sidewall 153 of the plug 148 of the base 104, in one or more embodiments the switch 157 may be located at any other suitable position on the base 104 (e.g., the switch 157 may be located on the lower surface 154 of the plug 148 of the base 104 or the lower surface 152 of the ball-catcher 147 of the base 104).

In the embodiment illustrated in FIGS. 1A-1H, the base 104 also includes an internally threaded blind bore 159 extending downward from the upper surface 151 of the ball-catcher 147 of the base 104 and into the plug 148 of base 104. The internal threads 159 are configured to engage the external threads 146 on the lower end 105 of the shaft 101 such that the base 104 may be detached from the shaft 101. In one or more embodiments, the portable lighting apparatus 100 may include one or more electrical connectors to facilitate detaching the base 104 from the shaft 101 (e.g., electrical wires 165 connecting the switch 157 on the base 104 to the one or more bulbs 107 on the housing 106 may include an electrical connector near the junction between the base 104 and the lower end 105 of the shaft 101 to facilitate removal of the base 104 and, for instance, replacement of the base 104 with a base having a different configuration, as described in more detail below.

Additionally, in one or more embodiments, the portable lighting apparatus 100 may include a light sensor 160 electrically coupled to the one or more bulbs 107 and configured to activate the one or more bulbs 107 when the ambient light drops below a threshold level of illumination (e.g., at dusk). In the illustrated embodiment, the light sensor 160 is located on an upper surface 161 of the top wall 112 of the cover 108. In one or more embodiments, the light sensor 160 may be located at any other suitable location on the portable lighting apparatus 100, such as, for instance, on any other portion of the lighting assembly 102 (e.g., on an upper surface of the flared wall 114 of the cover 108 or the cylindrical sidewall 113 of the cover 108) or on the shaft 101. In one or more embodiments, the portable lighting apparatus 100 may include either the light sensor 160 or the switch 157 to activate and deactivate the one or more bulbs 107. In one or more embodiments, the portable lighting apparatus 100 may include both the push-button switch 157 and the light sensor 160 such that the bulbs 107 will illuminate only when both the push-button switch 157 is depressed and the light sensor 160 detects ambient light below a threshold level of illumination. In one or more embodiments, the light sensor 160 may also be electrically coupled to the one or more bulbs 133 on the handle assembly 109 such that the one or more bulbs 133 on the handle assembly 133 will activate when the ambient light drops below a threshold level of illumination (e.g., at dusk).

With continued reference to the embodiment illustrated in FIGS. 1A-1H, the portable lighting apparatus 101 also includes one or more solar cells 162 electrically coupled to the one or more rechargeable batteries 144 in the shaft 101 such that the one or more solar cells 162 are configured to charge the one or more rechargeable batteries 144. In the illustrated embodiment, the one or more solar cells 162 are located on an upper surface 163 of the flared wall 114 of the cover 108. In one or more embodiments, the one or more solar cells 162 may be located at any other suitable location on the portable lighting apparatus 100, such as, for instance, on any other portion of the lighting assembly 102 (e.g., on the top wall 112 or the cylindrical sidewall 113 of the cover 108) or on the shaft 101. The one or more solar cells 162 may be any suitable type of solar cells, such as, for instance, thin film solar cells, amorphous silicon solar cells, dye-sensitized solar cells, or copper indium gallium selenide (CIGS) solar cells. In one or more alternate embodiments, the portable lighting apparatus 100 may be provided without the one or more solar cells 162.

Additionally, in the embodiment illustrated in FIGS. 1A-1H, the portable lighting apparatus 100 includes a charging port 164 configured to receive an electrical plug to recharge the one or more rechargeable batteries 144 in the shaft 101. In the illustrated embodiment, the charging port 164 is located on the shaft 101. In one or more embodiments, the charging port 164 may be located at any suitable location on the portable lighting apparatus 100, such as, for instance, on the housing 106 or on the base 104. In one or more embodiments, the portable lighting apparatus 100 may be provided with both the one or more solar cells 162 and the charging port 164 to charge the rechargeable batteries 144. In one or more alternate embodiments, the portable lighting apparatus 100 may be provided with only the one or more solar cells 162 or the charging port 164 to recharge the one or more rechargeable batteries 144.

In one or more embodiments, the portable lighting apparatus 100 may be hard-wired. For instance, in one or more embodiments, the cup 122 in the hole 123 may be hard-wired to a power source and the cup 122 may include electrical contacts configured to engage corresponding electrical contacts in the base 104 of the portable lighting apparatus 100 when the portable lighting apparatus 100 is inserted into the cup 122. In an embodiment in which the portable lighting apparatus 100 is hard-wired, the portable lighting apparatus 100 may be provided without the one or more rechargeable batteries 144, the one or more solar cells 162, the switch 157 (e.g., the push-button switch or pressure sensor) in the base 104, and/or the light sensor 160.

Figure 3:
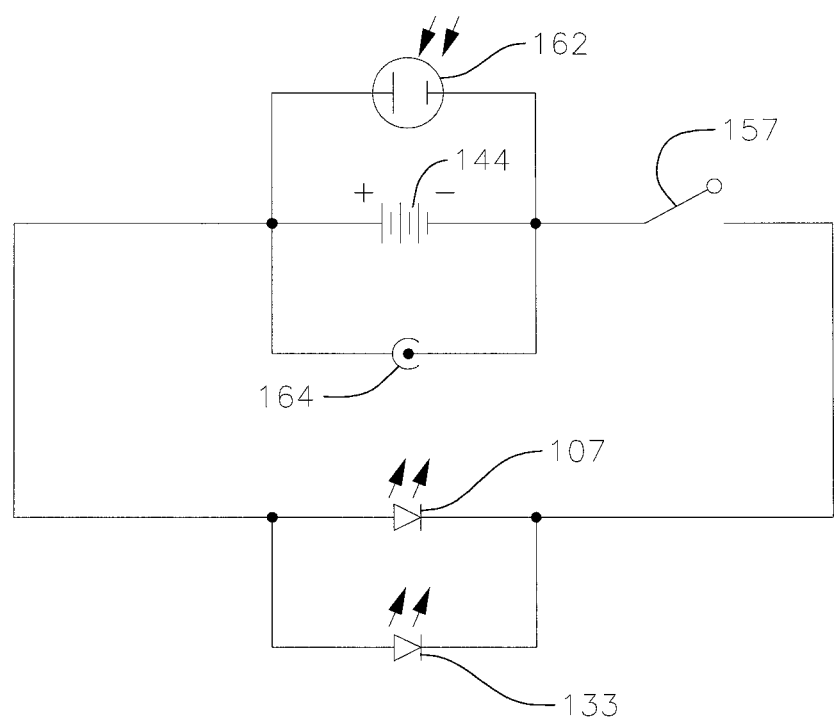
FIG. 3 is a schematic wiring diagram of a portable lighting apparatus according to one embodiment of the present disclosure.

FIG. 3 illustrates a schematic wiring diagram of the portable lighting apparatus 100 according to one embodiment of the present disclosure. In the embodiment illustrated in FIG. 3, the one or more bulbs 107 on the housing 106 and the one or more bulbs 133 on the handle assembly 109 are electrically coupled to the one or more rechargeable batteries 144 in the shaft 101. Additionally, in the illustrated embodiment, the switch 157 is coupled between the one or more bulbs 107, 133 and the one or more rechargeable batteries 144. When the switch 157 is activated (e.g., the portable lighting apparatus 100 is inserted into the hole 123 and the cup 122 in the practice putting green 124), the switch 157 makes the electrical connection between the one or more bulbs 107, 133 and the one or more rechargeable batteries 144 such that current flows to the one or more bulbs 107, 133 and thereby illuminates the one or more bulbs 107, 133. When the switch 157 is deactivated (e.g., by removing the portable lighting apparatus 100 from the hole 123 and the cup 122 in the practice putting green 124), the switch 157 breaks the electrical connection between the one or more bulbs 107, 133 and the one or more rechargeable batteries 144 and thereby turns off the one or more bulbs 107, 133. Additionally, in the illustrated embodiment, both the charging port 164 and the one or more solar cells 162 are electrically coupled to the one or more rechargeable batteries 144 to charge the rechargeable batteries 144.

With reference now to FIGS. 4A and 4B, a portable lighting apparatus 200 according to another embodiment of the present disclosure includes a shaft 201, a lighting assembly 202 coupled to an upper end 203 of the shaft 201, and a base 204 detachably coupled to a lower end 205 of the shaft 201. The shaft 201 and the lighting assembly 202 may be the same or similar to the embodiments of the shaft 101 and the lighting assembly 102 described above with reference to the embodiment of the portable lighting apparatus 100 illustrated in FIGS. 1A-1H, and therefore further description of the shaft 201 and the lighting assembly 202 are omitted. In the embodiment illustrated in FIGS. 4A and 4B, the base 204 is a spike configured to be driven into an earthen formation (e.g., the ground). In the illustrated embodiment, the spike 204 includes a cylindrical section 206, a conical section 207 extending downward from a lower end 208 of the cylindrical section 206, and a series of blades 209 circumferentially disposed around the cylindrical and conical sections 206, 207. Each of the blades 209 tapers between a wider upper end 210 and a narrower lower end 211. Together, the narrower lower ends 211 of the blades 209 define a point or a tip 212 of the spike 204. An upper end 213 of the spike 204 includes an internally threaded blind bore 214 configured to be threadedly coupled to external threads 215 on the lower end 205 of the shaft 201. In one or more embodiments, the spike 204 may be provided without the internally threaded blind bore 214 and the spike 204 may be integrally formed with the lower end 205 of the shaft 201. The blades 209 are configured to prevent the spike 204 from rotating in the earthen formation, which might otherwise cause the spike 204 to become inadvertently disengaged from the external threads 215 on the lower end 205 of the shaft 201. The spike 204 may be made out of any suitable hard and durable material, such as, for instance, metal or plastic.

FIG. 4C illustrates an alternate embodiment of the spike. In the embodiment illustrated in FIG. 4C, a spike 250 includes a head 251 (e.g., a cylindrical head) and a shank 252 extending downward from the head 251. In the illustrated embodiment, the shank 252 includes a straight section 253 (e.g., a cylindrical section) and a tapered section 254 (e.g., a conical section) at a lower end 255 of the shank 252. Additionally, in the illustrated embodiment, an upper end 256 of the spike 250 includes an internally threaded blind bore 257 configured to be threadedly coupled to the external threads 215 on the lower end 205 of the shaft 201. In one or more embodiments, the spike 250 may be provided without the internally threaded blind bore 257 and the spike 250 may be integrally formed with the lower end 205 of the shaft 201. The head 251 of the spike 250 is configured to limit the depth to which the spike 250 may be driven into the earthen formation. The spike 250 may be made out of any suitable hard and durable material, such as, for instance, metal or plastic.

With reference now to FIG. 5, a portable lighting apparatus 300 according to another embodiment of the present disclosure, includes a shaft 301, a lighting assembly 302 coupled to an upper end 303 of the shaft 301, and a base 304 detachably coupled to the shaft 301. The shaft 301 and the lighting assembly 302 may be the same or similar to the embodiments of the shaft 101 and the lighting assembly 102 described above with reference to the embodiment of the portable lighting apparatus 100 illustrated in FIGS. 1A-1H, and therefore further description of the shaft 301 and the lighting assembly 302 are omitted. In the embodiment illustrated in FIG. 5, the base 304 is a tripod configured to engage an earthen formation or a structure (e.g., a walkway). Legs 306 of the tripod 304 may be either fixed or collapsible. In the illustrated embodiment, an upper end 307 of the tripod 304 includes a clamp 308 configured to facilitate sliding the tripod 304 up and down along the shaft 301 to achieve the desired height of the portable lighting apparatus 300. Additionally, in the illustrated embodiment, the tripod 304 includes a shoe 309 having an internally threaded blind bore 310 configured to be threadedly coupled to external threads 311 on a lower end 305 of the shaft 301.

Figure 6:
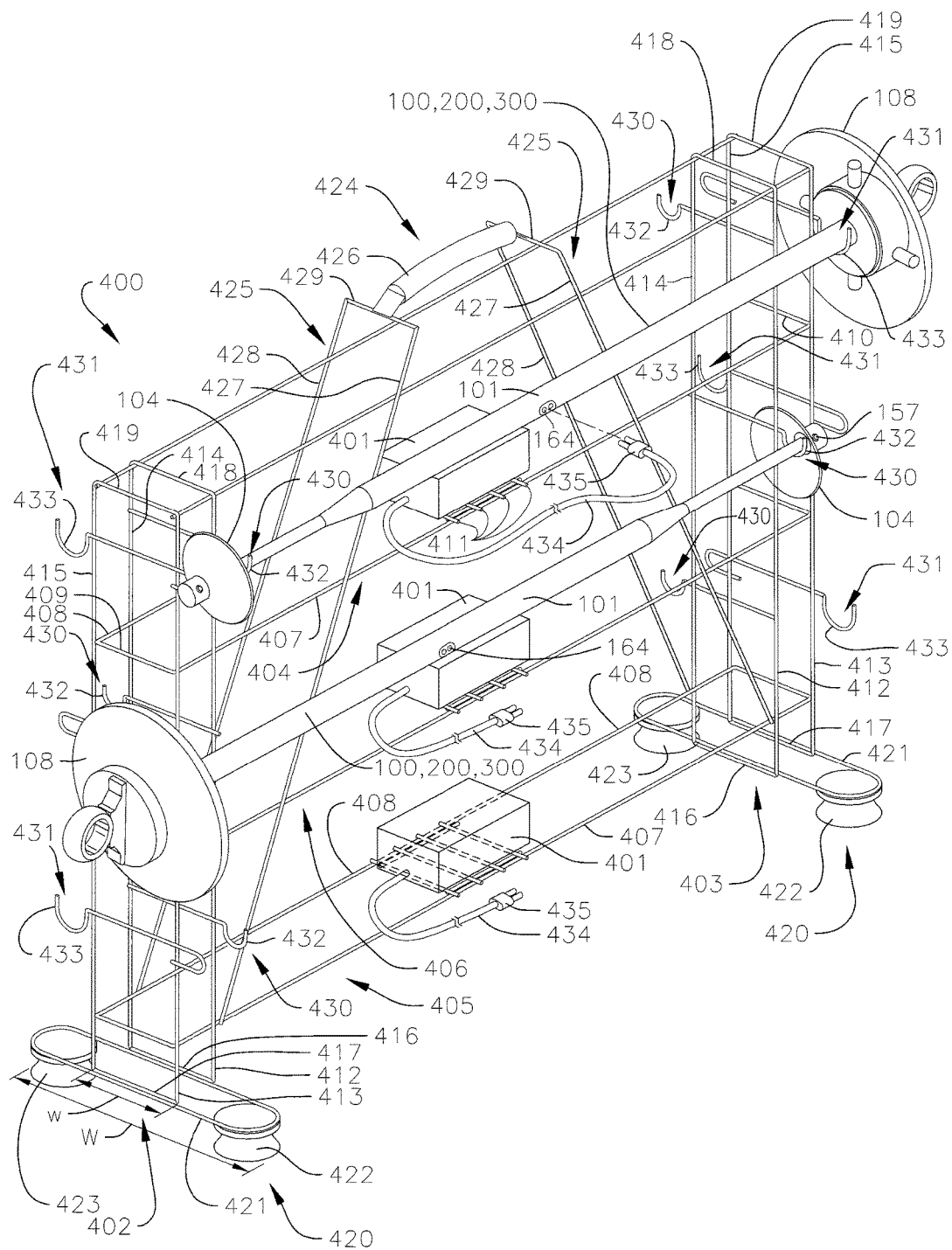
FIG. 6 is a perspective view of a carrying rack configured to support a plurality of portable lighting apparatuses according to one embodiment of the present disclosure.

FIG. 6 illustrates an embodiment of a carrying rack 400 configured to support a series of portable lighting apparatuses 100, 200, 300 and power supply units 401 for recharging the one or more rechargeable batteries 144 in the portable lighting apparatuses 100, 200, 300. In the illustrated embodiment, the carrying rack 400 includes a pair of left and right vertical support members 402, 403 and a series of horizontal shelves 404, 405, 406 extending between the left and right vertical support members 402, 403. Although in the illustrated embodiment the carrying rack 400 includes three shelves 404, 405, 406 (e.g., an upper shelf 404, a lower shelf 405, and an intermediate shelf 406 between the upper and lower shelves 404, 405), in one or more embodiments, the carrying rack 400 may include any other suitable number of shelves depending, for instance, on the desired number of power supply units 401 and/or portable lighting apparatuses 100 the carrying rack 400 is configured to support. Additionally, in the illustrated embodiment, each shelf 404, 405, 406 includes a front horizontal wire rod 407, a rear horizontal wire rod 408, and a pair of end wire rods 409, 410 extending transversely between opposite ends of the front and rear horizontal wire rods 407, 408. In the illustrated embodiment, each of the shelves 404, 405, 406 also includes a series of braces 411 extending transversely between the front and rear horizontal wire rods 407, 408 and located along intermediate portions of the front and rear horizontal wire rods 407, 408. The series of braces 411 on each shelf 404, 405, 406 are configured to provide support for one of the power supply units 401.

In the illustrated embodiment, the left and right vertical support members 402, 403 each include a pair of front vertical wire rods 412, 413, a pair of rear vertical wire rods 414, 415, a pair of lower horizontal wire rods 416, 417 connecting lower ends of the front vertical wire rods 412, 413 to lower ends of the rear vertical wire rods 414, 415, respectively, and a pair of upper horizontal wire rods 418, 419 connecting upper ends of the front vertical wire rods 412, 413 to upper ends of the rear vertical wire rods 414, 415, respectively. Together, the front and rear pairs of vertical wire rods 412, 413, 414, 415 and the lower and upper pairs of horizontal wire rods 416, 417, 418, 419 are arranged in a box-frame configuration.

With continued reference to the embodiment illustrated in FIG. 6, the carrying rack 400 also includes a support assembly 420 coupled to a lower end of each of the vertical support members 402, 403. In the illustrated embodiment, each of the support assemblies 420 includes an oblong wire rod 421 coupled to the pair of lower horizontal wire rods 416, 417 and a pair of feet 422, 423 coupled to opposite ends of the oblong wire rod 421. The feet 422, 423 are configured to support the carrying rack 400 in an upright position. Additionally, in the illustrated embodiment, a width W of each of the oblong wire rods 421 is greater than a width w of the vertical support members 402, 403 such that the feet 422, 423 extend out in front of, and to the rear of, the vertical support members 402, 403 to provide tilt stability to the carrying rack 400 (e.g., the width W of the support assemblies 420 is wider than the spacing between the front pair of vertical wire rods 412, 413 and the rear pair of vertical wire rods 414, 415 of the vertical support members 402, 403 and wider than the spacing between the front and rear horizontal wire rods 407, 408 of the shelves 404, 405, 406). In one or more embodiments, the support assemblies 420 on the lower ends of the vertical support members 402, 403 may include wheels (e.g., swivel casters) configured to facilitate transportation of the carrying rack 400.

With continued reference to the embodiment illustrated in FIG. 6, the carrying rack 400 also includes a handle assembly 424 configured to facilitate transportation of the carrying rack 400 and the power supply units 401 and the portable lighting apparatuses 100 supported thereon. For instance, the handle assembly 424 may be used to load the carrying rack 400, the power supply units 401, and the portable lighting apparatuses 100 onto a golf cart and then transported to the practice putting green. The portable lighting apparatuses 100 may then be removed from the carrying rack 400 and installed in the holes 123 and the cup 122 on the practice putting green 124 prior to the commencement of twilight or nighttime putting. Following twilight or nighttime putting, the portable lighting apparatuses 100 may be reloaded onto the carrying rack 400. The handle assembly 424 may then be used to load the carrying rack 400 and the portable lighting apparatuses 100 supported thereon onto a golf cart. The carrying rack 400 and the portable lighting apparatuses 100 may then be transported to a storage area or storage facility until the portable lighting apparatuses 100 are needed again to facilitate twilight or nighttime putting practice. The carrying rack 400 also permits convenient recharging of the portable lighting apparatuses 100 from a conventional power receptacle at the storage facility.

In the illustrated embodiment, the handle assembly 424 includes a pair of diagonal braces 425 extending upward and inward from the lower shelf 405 and a handle member 426 extending between upper ends of the diagonal braces 425. In the illustrated embodiment, each of the diagonal braces 425 includes a pair of front and rear diagonal wire rods 427, 428 and a cross-brace 429 extending transversely between upper ends of the front and rear diagonal wire rods 427, 428. In the illustrated embodiment, the front diagonal wire rods 427 are coupled to each of the front horizontal wire rods 407 of the shelves 404, 405, 406 and the rear diagonal wire rods 428 are coupled to each of the rear horizontal wire rods 408 of the shelves 404, 405, 406. In one or more embodiments, the diagonal braces 425 of the handle assembly 424 may be coupled to the vertical support members 402, 403. Additionally, in the illustrated embodiment, the handle member 426 and the upper ends of the diagonal braces 425 extend above the upper shelf 404 to provide access to the handle member 426.

In the embodiment illustrated in FIG. 6, the carrying rack 400 also includes a series of hooks coupled to the vertical support members 402, 403. The hooks are configured to support the portable lighting apparatuses 100. In the illustrated embodiment, the carrying rack 400 includes six pairs of hooks 430, 431 such that the carrying rack 400 is configured to support six portable lighting apparatuses 100. In the illustrated embodiment, three of the pairs of hooks 430, 431 are on the front side of the carrying rack 400 and the other three pairs of hooks 430, 431 are on the rear side of the carrying rack 400 such that the carrying rack 400 is configured to support three portable lighting apparatuses 100 on the front side of the carrying rack 400 and three portable lighting apparatuses 100 on the rear side of the carrying rack 400. Each pair of hooks 430, 431 includes one hook on the right vertical support member 403 and a corresponding hook on the left vertical support member 402. Additionally, in the illustrated embodiment, the pairs of hooks 430, 431 are vertically misaligned with the shelves 404, 405, 406 (e.g., a lower pair of hooks 430, 431 is positioned on the vertical support members 402, 403 between the lower shelf 405 and the middle shelf 406, an intermediate pair of hooks 430, 431 is positioned between the intermediate shelf 406 and the upper shelf 404, and an upper pair of hooks 430, 431 is positioned above the upper shelf 404). In one or more embodiments, the pairs of hooks 430, 431 may be vertically aligned with the shelves 404, 405, 406.

Additionally, in the illustrated embodiment, for each pair of hooks 430, 431, one of the hooks 430 includes a relatively smaller U-shaped hook member 432 and the other hook 431 includes a relatively larger U-shaped hook member 433. In the illustrated embodiment, the larger U-shaped hook members 433 are configured to engage the larger upper end 103 of the shaft 101 of the portable lighting apparatus 100 and the smaller U-shaped hook members 432 are configured to engage the smaller lower end 105 of the shaft 101 of the portable lighting apparatus 100. In the illustrated embodiment, the larger and smaller U-shaped hook members 433, 432 are alternately arranged vertically along the vertical support members 402, 403. In the illustrated embodiment, the larger and smaller U-shaped hook members 433, 432 are also alternately arranged front to back on the vertical support members 402, 403. For instance, in the illustrated embodiment, the upper and lower pairs of hooks 430, 431 on the front side of the carrying rack 400 each have the larger U-shaped hook member 433 on the right vertical support member 403 and the smaller U-shaped hook member 432 on the left vertical support member 402. The middle pair of hooks 430, 431 on the front side of the carrying rack 400 has the larger U-shaped hook member 433 on the left vertical support member 402 and the smaller U-shaped hook member 432 on the right vertical support member 403. Additionally, in the illustrated embodiment, the upper and lower pairs of hooks 430, 431 on the rear side of the carrying rack 400 each have the larger U-shaped hook member 433 on the left vertical support member 402 and the smaller U-shaped hook member 432 on the right vertical support member 403, and the middle pair of hooks 430, 431 on the rear side of the carrying rack 400 has the larger U-shaped hook 433 member on the right vertical support member 403 and the smaller U-shaped hook member 432 on the left vertical support member 402.

Accordingly, based on the arrangement of the larger and smaller U-shaped hook members 433, 432, the carrying rack 400 is configured to support the portable lighting apparatuses 100 in alternating orientations. For instance, in the illustrated embodiments, the portable lighting apparatuses 100 supported on the upper and lower pairs of hooks 430, 431 on the front side of the carrying rack 400 may be oriented with the covers 108 near the right vertical support member 403 and the portable lighting apparatus 100 supported on the middle pair of hooks 430, 431 on the front side of the carrying rack 400 may be oriented with the cover 108 near the left vertical support member 402. Additionally, the portable lighting apparatuses 100 supported on the upper and lower pairs of hooks 430, 431 on the rear side of the carrying rack 400 may be oriented with the covers 108 near the left vertical support member 402 and the portable lighting apparatus 100 supported on the middle pair of hooks 430, 431 on the rear side of the carrying rack 400 may be oriented with the cover 108 near the right vertical support member 403. The alternating orientation of the portable lighting apparatuses 100 on the carrying rack 400 is configured to minimize or at least reduce the size of the carrying rack 400. Otherwise, if the portable lighting apparatuses 100 were all arranged in the same orientation on the carrying rack 400, the size of the carrying rack 400 would have to be increased to prevent the covers 108 of adjacent portable lighting apparatuses 100 from contacting each other.

In one or more embodiments, the carrying rack 400 may have any other number of pairs of hooks 430, 431 and the pairs of hooks 430, 431 may be positioned in any other suitable locations on the carrying rack 400 depending on the desired number of portable lighting apparatuses 100 the carrying rack 400 is configured to support and the intended orientation of the portable lighting apparatuses 100 on the carrying rack 400. For instance, in one or more embodiments, the hooks 430, 431 may be positioned on the shelves 404, 405, 406. Additionally, although in the illustrated embodiment each pair of hooks 430, 431 includes a relatively larger U-shaped hook member 433 and a relatively smaller U-shaped hook member 432, in one or more embodiments, the U-shaped hook members in each of the pairs of hooks 430, 431 may be the same or substantially the same size.

In the embodiment illustrated in FIG. 6, each power supply unit 401 supported on one of the shelves 404, 405, 406 is configured to charge up to two portable lighting apparatuses 100. The power supply units 401 each include a cable 434 and an electrical plug 435 configured to plug into the charging ports 164 on the portable lighting apparatuses 100. For instance, the power supply unit 401 on the lower shelf 405 may charge the lower portable lighting apparatuses 100 on the front and the rear of the carrying rack 400, the power supply unit 401 on the middle shelf 406 may charge the middle portable lighting apparatuses 100 on the front and the rear of the carrying rack 400, and the power supply unit 401 on the upper shelf 404 may charge the upper portable lighting apparatuses 100 on the front and the rear of the carrying rack 400. The power supply units 401 may be any suitable type of device configured to supply a charge to the one or more rechargeable batteries 144 in the portable lighting apparatuses 100, such as, for instance, a battery pack or a transformer configured to plug into an external power supply (e.g., a wall outlet). In one or more embodiments, the carrying rack 400 may include any other suitable number of power supply units 401 depending on the number of portable lighting apparatuses 100 supported on the carrying rack 400.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A portable lighting apparatus, comprising:
   a shaft;
   a lighting assembly coupled to a first end of the shaft, the lighting assembly comprising:
      a housing centered on the shaft defining a chamber, the housing comprising a bottom wall and at least one sidewall extending up from the bottom wall;
      at least one first bulb outside the chamber coupled to an outer surface of the at least one sidewall of the housing; and
      a cover coupled to an upper end of the housing and overhanging the at least one first bulb and at least a portion of the housing, wherein an inner surface of the cover facing the outer surface of the at least one sidewall of the housing is adapted to reflect light emitted radially outward from the at least one first bulb;
      an annular handle coupled to the cover, the annular handle defining an opening;
      at least one second bulb connected to an outer surface of the annular handle, the at least one second bulb configured to illuminate at least a portion of the outer surface of the annular handle and the cover;
   a rechargeable battery housed in the shaft coupled to the at least one first bulb by an electrical wire extending through at least a portion of the shaft and out through the chamber defined by the housing;
   a base coupled to a second end of the shaft; and
   a charging port on the outer surface of the at least one sidewall of the housing and under the cover electrically coupled to the rechargeable battery,
      wherein the at least one first bulb is between the outer surface of the at least one sidewall of the housing and the inner surface of the cover.

2. A portable lighting apparatus, comprising:
   a shaft;
   a lighting assembly coupled to a first end of the shaft, the lighting assembly comprising:
      a housing defining a chamber;

at least one bulb outside the chamber coupled to a surface of the housing; and a cover coupled to an upper end of the housing and overhanging the at least one bulb and at least a portion of the housing, wherein an inner surface of the cover facing the surface of the housing is adapted to reflect light emitted radially outward from the at least one bulb;

a rechargeable battery housed in the shaft coupled to the at least one bulb by an electrical wire extending through at least a portion of the shaft and out through the chamber defined by the housing; and a base coupled to a second end of the shaft, wherein the base is configured to engage a golf cup in a golf hole, the base comprising a frusto-conical ball-catcher and a cylindrical plug extending down from a lower end of the frusto-conical ball-catcher and adapted to mate with a central bore in the golf cup.

3. The portable lighting apparatus of claim 1, wherein the base comprises a spike.

4. The portable lighting apparatus of claim 1, wherein the base comprises a plurality of legs.

5. A portable lighting apparatus, comprising:
a shaft;
a lighting assembly coupled to a first end of the shaft, the lighting assembly comprising:
a housing centered on the shaft defining a chamber, the housing comprising a bottom wall and at least one sidewall extending up from the bottom wall;
at least one first bulb outside the chamber coupled to an outer surface of the at least one sidewall of the housing;
a switch coupled to the at least one first bulb configured to activate and deactivate the at least one first bulb;
a cover coupled to an upper end of the housing and overhanging the at least one first bulb and at least a portion of the housing, wherein an inner surface of the cover facing the outer surface of the at least one sidewall of the housing is adapted to reflect light emitted radially outward from the at least one first bulb;
at least one second bulb connected to an outer surface of the annular handle, the at least one second bulb configured to illuminate at least a portion of the outer surface of the annular handle and the cover;
a rechargeable battery housed in the shaft coupled to the at least one first bulb by an electrical wire extending through at least a portion of the shaft and out through the chamber defined by the housing;
a base coupled to a second end of the shaft; and
a charging port on the outer surface of the at least one sidewall of the housing and under the cover electrically coupled to the rechargeable battery,
wherein the at least one first bulb is between the outer surface of the at least one sidewall of the housing and the inner surface of the cover, and
wherein the switch is a pressure sensor coupled to the base, and wherein the pressure sensor is configured to activate the at least one first bulb when a threshold pressure on the base is detected.

6. The portable lighting apparatus of claim 5, wherein the switch is a push-button switch coupled to the base, and wherein the push-button switch is configured to move between an extended position in which the at least one first bulb is deactivated and a depressed position in which the at least one first bulb is activated.

7. The portable lighting apparatus of claim 1, wherein the lighting assembly further comprises at least one solar cell coupled to the rechargeable battery to recharge the rechargeable battery.

8. The portable lighting apparatus of claim 1, wherein the lighting assembly further comprises a light sensor configured to illuminate the at least one first bulb when ambient light reaches a minimal intensity.

9. The portable lighting apparatus of claim 1, wherein the at least one first bulb is a light-emitting diode.

10. The portable lighting apparatus of claim 1, wherein the at least one first bulb is a plurality of light-emitting diodes equidistantly arranged around the outer surface of the at least one sidewall of the housing.

11. A lighting system, comprising:
a portable lighting apparatus, comprising:
a shaft;
a lighting assembly coupled to a first end of the shaft, the lighting assembly comprising:
a housing;
at least one bulb coupled to an outer surface of the housing; and
a cover coupled to the housing and overhanging the at least one bulb, wherein an inner surface of the cover facing the at least one bulb is adapted to reflect light emitted from the at least one bulb;
a rechargeable battery coupled to the at least one bulb;
a charging port coupled to the rechargeable battery; and
a base coupled to a second end of the shaft; and
a carrying rack configured to support a plurality of the portable lighting apparatuses, wherein the carrying rack comprises at least one power supply unit, the at least one power supply unit comprising an electrical plug configured to plug into the charging port to charge the rechargeable battery in one of the plurality of portable lighting apparatuses.

12. The lighting system of claim 11, wherein the carrying rack comprises:
a pair of vertical support members;
a plurality of shelves extending between the pair of vertical support members, wherein the at least one power supply unit is supported on one of the plurality of shelves;
a handle configured to facilitate transportation of the carrying rack; and
a plurality of pairs of hooks coupled to the pair of vertical support members, wherein each of the plurality of pairs of hooks comprises a relatively smaller hook and a relatively larger hook, and wherein the plurality of pairs of hooks are configured to support the plurality of portable lighting apparatuses in alternating orientations.

13. A portable lighting system for illuminating portions of a golf practice putting green, comprising:
a portable lighting apparatus, comprising:
a flagstick;
a lighting assembly coupled to a first end of the flagstick, the lighting assembly comprising:
a housing;
at least one bulb coupled to an outer surface of the housing; and
a cover coupled to the housing and overhanging the at least one bulb, wherein an inner surface of the cover facing the at least one bulb is adapted to reflect light emitted from the at least one bulb;
a rechargeable battery housed in the flagstick and coupled to the at least one bulb;

a base coupled to a second end of the flagstick, wherein the base is configured to engage a golf cup in a golf hole; and a switch on the base electrically coupled to the at least one bulb, wherein the switch is configured to activate and deactivate the at least one bulb when the base is inserted and removed from the golf cup.

14. The portable lighting system of claim 13, wherein the cover comprises a flared wall extending outward from a longitudinal axis of the flagstick and extending downward toward the second end of the flagstick.

15. The portable lighting system of claim 13, further comprising a carrying rack configured to support a plurality of the portable lighting apparatuses, wherein the carrying rack comprises:

a pair of vertical support members;

a plurality of shelves extending between the pair of vertical support members, wherein the at least one power supply unit is supported on one of the plurality of shelves;

a handle configured to facilitate transportation of the carrying rack; and a plurality of pairs of hooks coupled to the pair of vertical support members, wherein each of the plurality of pairs of hooks comprises a relatively smaller hook and a relatively larger hook, and wherein the plurality of pairs of hooks are configured to support the plurality of portable lighting apparatuses in alternating orientations.

\* \* \* \* \*